July 30, 1940.   R. H. KITTNER ET AL   2,209,403
RUBBER SHEATHING AND METHOD OF APPLYING SAME
Filed April 22, 1939
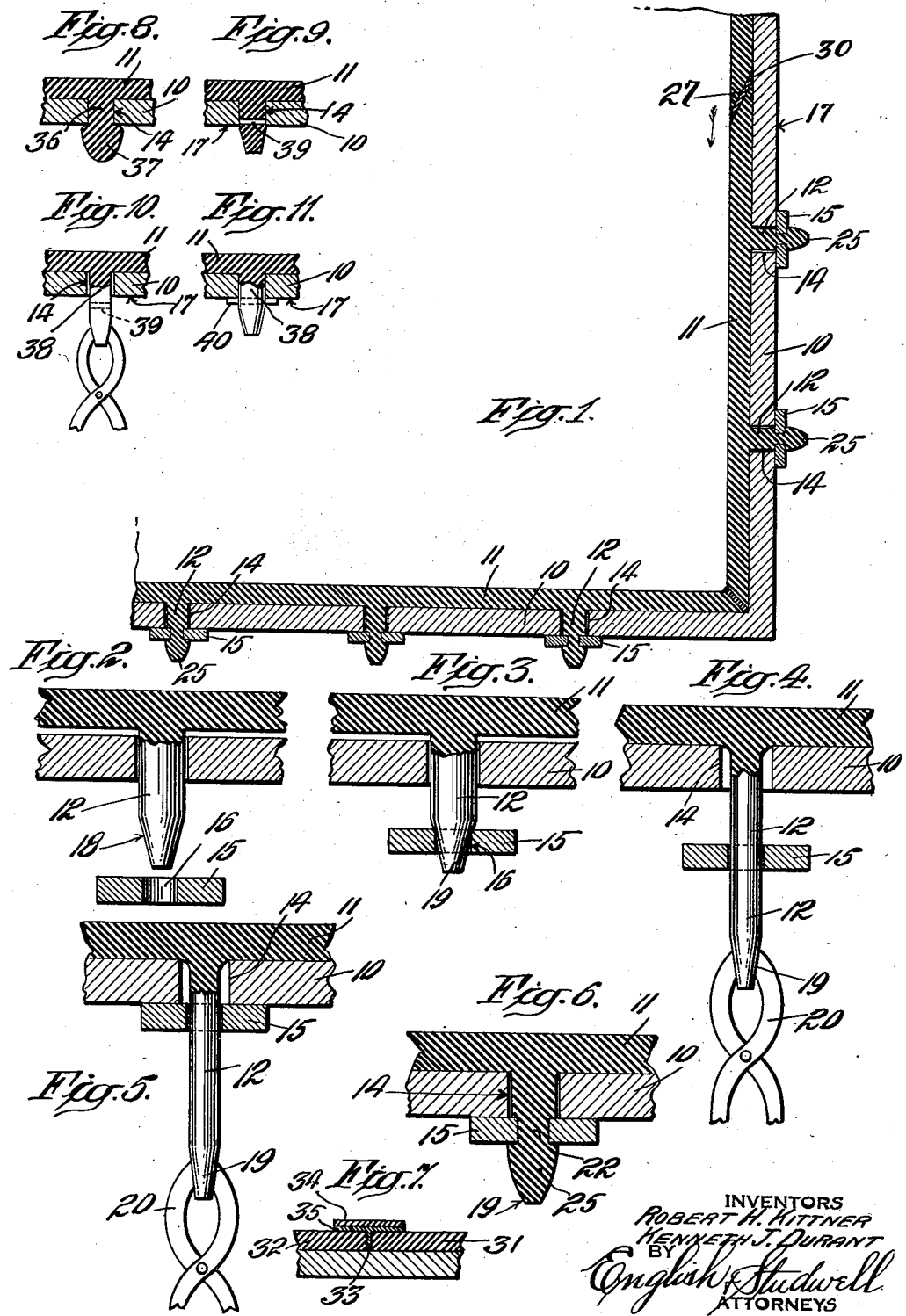
INVENTORS
ROBERT H. KITTNER
KENNETH J. DURANT
BY
English & Studwell
ATTORNEYS Patented July 30, 1940

2,209,403

UNITED STATES PATENT OFFICE 2,209,403

RUBBER SHEATHING AND METHOD OF APPLYING SAME

Robert H. Kittner, Shaker Heights, and Kenneth J. Durant, Akron, Ohio, assignors to American Hard Rubber Company, New York, N. Y., a corporation of New York Application April 22, 1939, Serial No. 269,530

6 Claims. (Cl. 18—59)

The invention relates to an improvement in plastic compound sheathings for lining or covering the surface of walls, receptacles, chutes and other structures it is desired to protect or insulate by a layer or coating of hard or soft plastic compound. The plastic compound may be vulcanizable hard and soft rubber compositions, vulcanizable synthetic rubber compounds, and other suitable plastic compounds which are especially adapted for resisting abrasion or acid action. The invention is of general application, but for the sake of simplicity of illustration and description, it will in the present disclosure be restricted to the lining with plastic compound of the supporting wall or walls of receptacles, such as tumbling barrels or boxes, it being understood that the described application is illustrative only and not limitative.

The application of a protective coating or layer of either hard or soft rubber or other plastic compound to a supporting wall or other surface, either as the lining of a tank or receptacle, or the covering of a chute, is usually effected at the manufactory where the structure is made. Occasionally the plastic compound lining of a receptacle or other structure will outlast the structure itself, whether it is composed of metal, wood or other material. Frequently, however, it has been found necessary to renew or replace the plastic compound linings of such receptacles or structures as tumbling barrels or chutes used for the treatment or the conveyance of abrasive substances, such as minerals and coal. These structures are usually composed of metal to which is applied a coating or lining of vulcanized soft rubber or similar plastic compound. In the course of time the abrasion of the protective coating by the substances impinging against it, destroys its usefulness before the metallic support is worn out. It is then necessary to send the structure back to the manufactory for the replacement of the protective coating or lining of rubber or other plastic compound. This is an expensive proceeding, it is time consuming and also takes the piece of apparatus out of use for a considerable period.

It is the object of the present invention to remedy this difficulty by providing a novel form of rubber or other plastic compound sheathing, whether used as a lining or as a coating, and a novel method of applying the sheathing to the structure so that the necessary repairs can be made in situ, without the necessity of shipping the structure back to the manufactory and then returning it to the plant where it is to be used.

To this end the invention consists in the improved plastic compound sheathing and method of applying it fully described hereinafter and particularly pointed out in the appended claims.

In the accompanying drawing, there is shown for the purpose of illustrating the invention the application of the improved plastic compound sheathing to the interior of a tumbling barrel. Fig. 1 is a transverse section through a portion of a tumbling barrel, showing the application of the plastic compound sheathing or lining thereto; Figs. 2 to 6 illustrate the progressive steps of one form or method of applying the improved plastic compound sheathing to a supporting wall or other surface; Fig. 7 is a detail section showing a butt and lap joint suitable for use in a receptacle for containing liquid; Fig. 8 is a detail view showing a modified form of anchoring the plastic compound sheathing to the supporting wall; and Figs. 9, 10 and 11 are detail views of another modified form of locking means for securing the plastic compound sheathing to the supporting wall and indicating the method of application.

In order that the plastic-compound sheathed structure, the protective sheathing or coating of which has been destroyed by use, may be relined or recoated in situ without the necessity of shipping it back to the manufactory, we prepare the plastic compound sheathing in sheets of convenient area and thickness which may be in hard or soft condition, such as vulcanized hard or soft rubber. The structure to be relined or recovered by the sheathing will be provided with a series of spaced holes penetrating the wall or walls of the structure, and one surface of the sheets or plates of plastic compound will be provided with projecting studs or rivets in soft or elastic condition and preferably integral with the sheets or plates. These studs or rivets are spaced apart correspondingly to the spacing of the holes in the wall or structure, one surface of which is to be covered or lined with a plastic compound sheathing. The sheet of plastic compound having been applied to the surface to be covered, with the elastic studs projecting through the holes, the studs are axially elongated and locking means applied on the projecting ends. In the form of the invention shown in Figs. 1 to 6 a washer of solid hard material, such as hard rubber, having a hole of less diameter than the studs in their normal condition, is slipped over each elongated stud and pressed against the outer surface of the wall, the other surface of which is coated with the plastic compound sheathing.

The elongated stud is then released so as to permit the elastic material to resume its normal diameter both in the hole in the wall and at its projecting outer end, which extends beyond the outer surface of the washer. The hole in the washer being of less diameter than that of the stud in its normal condition, the washer will thus be held firmly against the outer surface of the wall, and the plastic compound sheathing will be anchored or held firmly in place lining the receptacle or coating the supporting structure. Figs. 8 to 11 indicate modified forms of securing the plastic compound sheathing in place.

The structure shown in Fig. 1 is a portion of a tumbling barrel 10 which originally was lined with a plastic compound sheathing at the manufactory, and which has been relined according to the principle of the present invention without shipping the tumbling barrel back to the manufactory. The novel plastic compound lining or sheathing is made in section of convenient size or area, and may be of any preferred thickness. The surface of each sheet 11 of plastic compound facing or exposed to the interior of the receptacle is plane and smooth and the other surface is provided at regular intervals with soft or elastic studs or rivets 12 which are preferably formed integrally with the sheets 11 whether the latter are composed of vulcanized hard or soft plastic compound, such as vulcanized hard or soft rubber. It will be understood that each receptacle or other surface to be relined or resheathed with the novel sheathing is provided with spaced holes 14 corresponding in number and arrangement to the studs or rivets 12. The studs 12 are somewhat longer than the thickness of the supporting wall or other structure 10.

The sheets or lining sections 11 of plastic compound are held in position on the wall 10, in the form of the invention shown in Figs. 1 to 6, by providing the projecting end of each stud 12 with a locking element in the form of a washer 15 having a central bore 16 therein which is smaller in diameter than the diameter of the studs 12, as clearly indicated in Figs. 2, 3, and 6. To lock each washer firmly in position against the outer surface of the wall 10 and thereby anchor the sheets 11 in place on the other surface of the wall 10, the outer end of each stud 12 is tapered, as indicated at 18, to a point somewhat less in diameter than the diameter of the hole 16 in each washer 15 in order that the washer may be slipped over the tapered end 18 of the stud and leave the outer end of each stud projecting a short distance beyond the outer surface of the washer 15, as indicated at 19 in Fig. 3. To elongate each stud 12 to a diameter less than the diameter of the hole 16 in each washer 15, so that the washer may be slipped over the elongated stud and pressed into engagement with the outer surface 17 of the wall 10, the outer end 19 of each stud may conveniently be grasped by a pair of pliers 20 and pulled outwardly, as shown in Figs. 4 and 5. When the stud is released it not only contracts axially but also expands radially to its normal diameter, except at the point 22 which is surrounded by the washer 15, as indicated in Fig. 6, in which figure the base or inner end of the stud is shown occupying the hole 14 and the outer end 19 of the stud forms a head 25 pressing inwardly against the outer surface of the washer 15, thereby holding the lining or sheathing 11 against the inner surface of the wall 10.

It is sometimes convenient to employ other methods of locking the outer ends of the studs 12 against the outer surface 17 of the supporting wall to anchor the sheathing 12 against the other surface of the wall. In the modification shown in Fig. 8 the original diameter of the elastic stud 36 is greater than that of the hole 14, and therefore must be elongated before the stud is inserted through the hole 14. When this has been done and the outer end of the stud released it will contract and form the enlarged head 37, which being greater in diameter than that of the hole 14 firmly anchors the sheathing 11 against the wall 10.

In the form of locking means shown in Figs. 9, 10 and 11, the original diameter of the stud 38 may be about that of the hole 14. This stud is provided with a transverse pin-receiving hole 39 at a point distant from the base of the stud less than the thickness of the wall 10, as shown in Fig. 9. To lock the stud 38 against the outer surface 17 of the supporting wall 10 it is simply necessary to elongate the stud 38 by pulling outwardly on its outer end, as indicated in Fig. 10, until the hole 39 is beyond the outer surface 17 of the wall 10. Thereupon a pin 40 is slipped through the hole 39 and the outer end of the stud 38 released, whereupon the stud 38 contracts axially and the pin 40 is firmly locked against the outer surface 17 of the wall 10, as indicated in Fig. 11, to anchor the sheathing 11 against the other surface of the wall. Still other forms of locking means may be employed to keep the studs in stretched condition and thereby firmly hold the sheathing against the supporting wall.

Since the novel form of plastic compound lining or sheathing for the walls of receptacles or other surfaces made in sections, are usually smaller than the surface to be covered, a plurality of sections will be employed to cover a surface, requiring the formation of a joint between adjacent sections. These joints may be formed in any convenient way, either as a skived joint, indicated generally at 27 in Fig. 1, or as a butt and lap joint, as shown in Fig. 7. The skived joint shown in Fig. 1 is suitable for a tumbling barrel or a chute in which the direction of flow of the materials being treated is indicated by the arrow. The oblique end of the lining sections are spaced slightly apart and the opening between them is filled with cement 30. The butt and lap joint shown in Fig. 7 is suitable for use in tanks adapted to contain liquids. The adjacent ends of two sections of lining are indicated at 31 and 32 and the space between them is filled with cement 33 and the joint thus formed is covered by a thin strip of plastic compound 34 which is secured to the inner surfaces of the lining sections 31 and 32 by an interposed layer of cement 35.

Having thus described the invention, what we claim as new is:

1. A structure comprising a supporting wall having a plurality of spaced holes therethrough, a sheathing applied to one surface of the wall and having a plurality of elastic studs extending therefrom longer than the thickness of the wall and inserted in the holes of the wall with their ends projecting beyond the other surface of the wall, a portion of the studs being in stretched condition and locking means attached to the projecting ends of the studs to hold the sheathing firmly against the wall.

2. The method of protecting one surface of a wall having a hole therethrough which consists in applying to the said surface of the wall a sheet of material having an elastic stud extending from one surface thereof longer than the thickness of the wall so that the end of the stud will project beyond the other surface of the wall, stretching the stud axially, applying locking means to the projecting end of the stud and then releasing the stud so that the contraction thereof will bring the locking means firmly against the second surface of the wall so as to anchor the sheathing against the first surface of the wall.

3. A structure comprising a supporting wall having a plurality of spaced holes therethrough, a rubber sheathing applied to one surface of the wall and having a plurality of stretched soft rubber studs extending from one surface thereof longer than the thickness of the wall and inserted in the holes in the wall with their outer ends projecting beyond the other surface of the wall, and a hard-material washer placed on the projecting end of each soft rubber stud and having a hole therein smaller than the diameter of the stud in its normal condition to hold the rubber sheathing against the first surface of the wall.

4. A structure comprising a supporting wall having a hole therethrough, a sheet of vulcanized rubber applied to one surface of the wall and having a soft rubber stud longer than the thickness of the wall projecting through the hole, a portion of said stud being in stretched condition and its outer end in substantially normal condition, and a washer of solid material having a hole therein of less diameter than the normal thickness of the stud placed on the stretched part of the projecting end of the stud and being held against the outer surface of the wall by the outer end of the stud.

5. The method of securing a vulcanized rubber sheathing against one surface of a supporting wall having a plurality of holes therethrough, which consists in applying to said surface of the wall a rubber sheathing having a plurality of elastic studs corresponding to the holes and extending from one surface thereof longer than the thickness of the wall so that the studs will be received in the corresponding holes with their outer ends projecting beyond the other surface of the wall, stretching the studs outwardly from the wall, placing over each stretched stud and against the second surface of the wall a washer having a hole therein smaller in diameter than the diameter of the stud in its normal condition and releasing the end of the stud so as to permit it to expand laterally and thereby engage with the outer surface of the washer to hold it against the wall.

6. The method of securing a rubber lining to one surface of a supporting wall having a hole therethrough, which consists in applying to said surface of the wall a sheet of vulcanized rubber lining having an elastic stud extending from one surface thereof longer than the thickness of the wall so that the end of the stud will project beyond the other surface of the wall, stretching the stud axially, placing over the stretched stud and against the outer surface of the wall a washer having a hole therein smaller than the diameter of the stud in normal condition and then releasing the stud so that the outer end thereof will resume its normal condition and hold the washer against the second surface of the wall.

ROBERT H. KITTNER.
KENNETH J. DURANT.